US006499034B1

United States Patent
Mackinlay

(10) Patent No.: US 6,499,034 B1
(45) Date of Patent: Dec. 24, 2002

(54) BRISTLELINES: A VISUALIZATION FOR DISCOVERY RELATIONSHIPS BETWEEN SORTED WEB DOCUMENTS AND THEIR USAGE DATA

(75) Inventor: Jock D. Mackinlay, Palo Alto, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/415,017

(22) Filed: Oct. 7, 1999

(51) Int. Cl.$^7$ .................. G06F 17/30; G06F 15/173; G09G 5/00
(52) U.S. Cl. .................. 707/102; 709/224; 714/47; 345/736
(58) Field of Search .................. 707/104, 3–6, 707/102; 345/850, 848, 782, 781, 763, 736; 714/47; 709/224

(56) References Cited

U.S. PATENT DOCUMENTS

| | | | | |
|---|---|---|---|---|
| 5,951,644 A | * | 9/1999 | Creemer .................. | 370/229 |
| 6,112,238 A | * | 8/2000 | Boyd et al. .................. | 709/218 |
| 6,115,718 A | * | 9/2000 | Huberman et al. .......... | 707/102 |
| 6,138,157 A | * | 10/2000 | Welter et al. ................ | 709/224 |
| 6,405,195 B1 | * | 6/2002 | Ahlberg .................. | 345/700 |

FOREIGN PATENT DOCUMENTS

WO   WO98/38614   *  9/1998 .................. 17/30

OTHER PUBLICATIONS

Carlis, John V. and Konstan, Joseph A., *Interactive Visualization of Serial Periodic Data*, UIST, San Francisco, California, 1998, pp. 29–38 Nov. 1998.

* cited by examiner

Primary Examiner—Hosain T. Alam
(74) Attorney, Agent, or Firm—Fliesler Dubb Meyer & Lovejoy LLP

(57) ABSTRACT

A method and computer readable medium for generating a graph which displays amounts of access to computer files, such as URL's on the world wide web, over a period of time. Time is mapped along a central axis, and a plurality of file identifiers is mapped radially about the radial axis as lines having varying distances from the radial axis. The lines may be arranged at angles of rotation about the radial axis and are colored to represent the lexicographical similarity of the nodes. Alpha bending is utilized to reveal lines having an angle of rotations near 0 degrees that would otherwise be concealed by neighboring lines. In an alternative embodiment, a two dimensional graph displays instantaneous access information for a plurality of file identifiers, where angular rotation and color may also be used to represent the grouping of the nodes, and distances of radial lines from an origin represent access values to respective files. The present invention may be used to represent traffic patterns across nodes in a network, database queries, or any other application where visualization of numerical values associated with discrete entities is desired.

12 Claims, 8 Drawing Sheets

BRISTLELINES: A VISUALIZATION FOR DISCOVERY RELATIONSHIPS BETWEEN SORTED WEB DOCUMENTS AND THEIR USAGE DATA

1. Field of the Invention

The present invention relates generally to analyzing computer network activity. More particularly, the present invention relates to visualizing traffic patterns over a computer network that correlates related documents and their associated usage data.

2. Background of the Invention

A global computer network exists as a collection of smaller networks interconnected to allow them to function as a single virtual network. One such global computer network is the World Wide Web ("the Web"). Users of the Web access nodes or websites stored on connected servers all over the world. A website is a file stored at a physical location on a server that contains content an entity wishes to share with the rest of the users on the Web. The popularity of the Web has made websites effective marketing tools through which businesses may advertise products and services, news services provide news on a broad range of topics, and libraries provide online volumes of all types of information.

Web browsers allow individual users to search the Web for a particular topic, and return the websites address conforming to a universal resource language (URL), which allows the user to immediately access desired website. Large websites will often maintain enormous numbers of files with large storage and processing requirements. Commercial Web servers maintain many websites. Because Web traffic patterns shift dramatically based on the time of day, the day of the week, and sporadic events, it is important to be able to monitor the traffic patterns so that resources such as bandwidth and storage space may be allocated accordingly.

For example, objective information such as which websites are being accessed, how often they have been accessed, and which files are being downloaded is very valuable information both to the entity responsible for the content on the website as well as the entity managing the server which hosts the website. Based on web traffic information, an individual site may be edited for content based on usage, with more emphasis placed on areas that receive high traffic, and areas that are rarely visited may be removed. For marketing purposes, a company that posts product information on a website may use traffic information to gauge the popularity or potential success of a new product or service.

Conventional attempts to quantify Web traffic have focused on the use of log files, which list websites and numbers of hits or accesses. However, for a large number of websites, or for a large number of files within a given website, it is difficult to convey traffic information effectively. One visualization method, described as Interactive Visualization of Serial Periodic Data, and published in the Proceedings of the ACM Symposium on User Interface Software and Technology, November, 1998, describes a method of displaying data that is serial along a spiral axis and periodic along the radii from the axis. However, this visualization technique does not avoid the extreme aspect ratio of plotting a large number of URLs, such that widely varying values are difficult to visualize. It also conceals information within the image.

Thus, there is a need for a method and apparatus to visualize computer network traffic in a manner that is meaningful to a viewer.

SUMMARY

The present invention allows the generation of a three-dimensional chart having a radial layout which displays network traffic across selected nodes on a network over a period of time. Graph 100 may be shown in a window displayed as a three-dimensional window 101. Graph 100 shows 30 days of Web traffic from approximately 5000 URLs that are sorted lexicographically. Time is mapped along the x-axis 102. The URLs are mapped radially about the axis 102. As shown, the mapping is only displayed across an angle span of 180 degrees because in the preferred embodiment there is no relationship between the first and last URL. However, larger angle spans may be used. Usage or access to computer files corresponding to the individual URLs is mapped to the distance from axis 102.

In one aspect, the present invention provides a method for visualizing relationships between files stored on a computer network and usage data associated with the files, the method comprising the steps of: (a) obtaining information containing at least one identifier identifying a node in a network and the number of user accesses to the node over a period of time; and (b) creating a graph wherein the information is displayed in a three dimensional line chart with a radial layout, where a first distance between a line and a radial axis represents number of accesses to the node, time is mapped to the radial axis, and nodes having similar identifiers are represented by lines having similar angles of rotation about the radial axis.

In another aspect, the present invention provides a computer readable medium for use with computer apparatus, the medium including computer instructions which, when executed by the computer apparatus: (a) obtain information containing at least one node identifier identifying a node and a number of user accesses to the node over a period of time; and (b) create a graph wherein the information is displayed in a three dimensional line chart with a radial layout, where a first distance between a line and a radial axis represents number of accesses to the node, time is mapped to the radial axis, and nodes having similar identifiers are represented by lines having similar angles of rotation about the radial axis.

In another aspect, the present invention provides a method for visualizing relationships between nodes stored on a computer network and usage data associated with the nodes, the method comprising the steps of: (a) obtaining information containing at least one node identifier identifying a node and the number of user accesses to the node at a specified time; and (b) creating a graph wherein the information is displayed in a two dimensional line chart having a radial layout about a point in a single dimension, where a line having an angle of rotation about the point and extending from the point represents number of accesses to the node, and nodes having similar identifiers are represented by lines having similar angles of rotation about the point.

DETAILED DESCRIPTION OF THE INVENTION

Figure 1A:
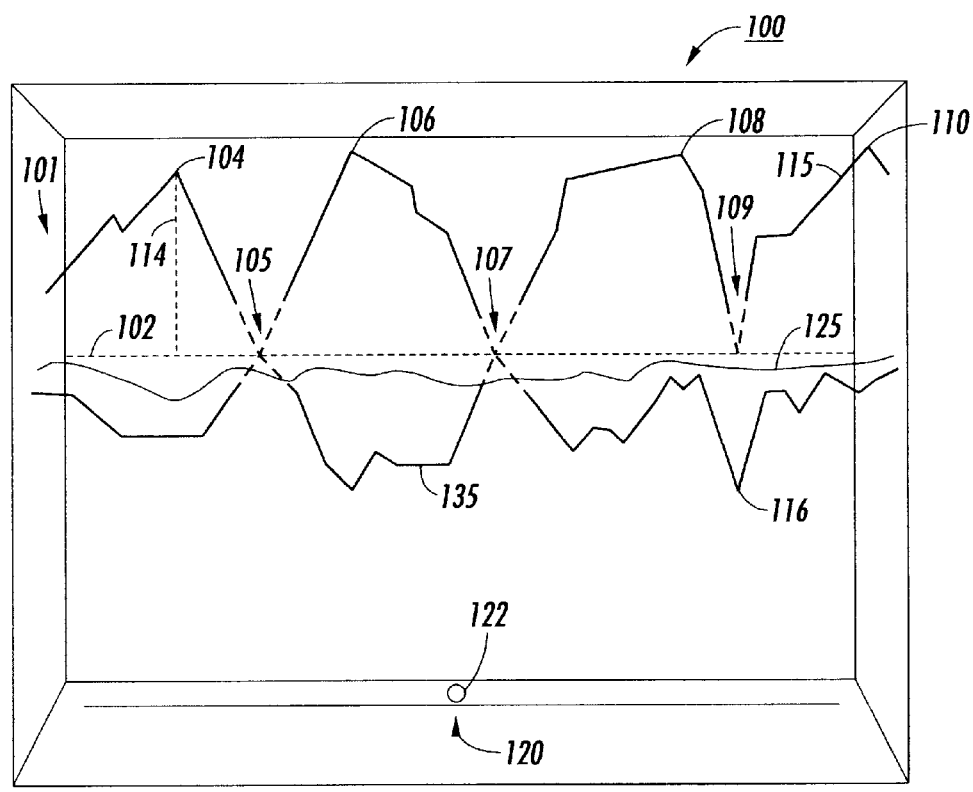
FIG. 1A shows an orientation of a graph produced by an embodiment of the invention.
Figure 1B:
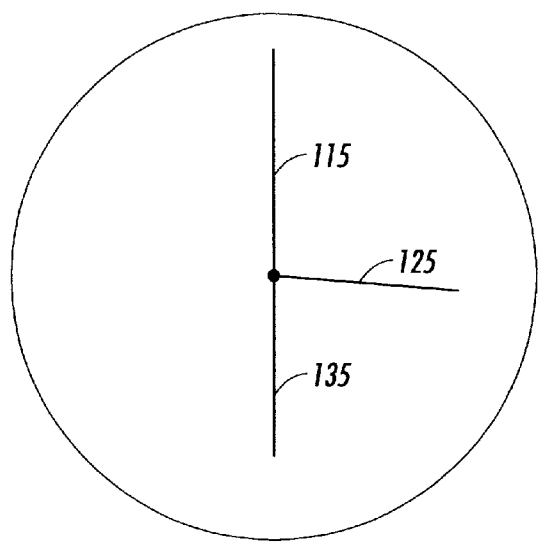
FIG. 1B shows the angles of rotation of lines on the graph in FIG. 1A.

Directing attention to FIG. 1A, graph 100 shows a three-dimensional chart having a radial layout. Graph 100 may be shown in a window displayed as a three-dimensional window 101. Graph 100 shows traffic over a period of time across a plurality of URLs that are sorted lexicographically. Time is mapped along the x-axis 102. The URLs are mapped radially about the axis 102, represented by lines 115, 125, 135. Line 115 may be colored red, while line 125 may be colored blue and line 135 colored green. While only three URL's are mapped for simplicity, a large number of lines may be represented by varying the colors to different shades of red, green and blue. By grouping the different URL's by color shades, lexicographical or other ordering of the graph may be implemented. In a case where the present invention is used to visualize traffic on a single website having many pages, for example, a news site which publishes many stories on individual pages on a daily basis, the colors may be distributed in the following manner: lines having a reddish tint may relate to stories dealing with politics. Lines having a bluish tint may be related to stories dealing with sports, and lines having a greenish tint may be related to local news stories.

As shown in FIGS. 1A through 2B, the mapping is displayed across an angle span of approximately 180 degrees because there is no relationship between the first and last URL. However, larger angle spans may be used. FIG. 1B shows a side view of graph 100 to further illustrate the angles of rotation of lines 115, 125 and 135. Usage corresponding to the individual URLs is mapped to the distance from axis 102. For instance, line 115 has a peak at point 104 that is at a distance 114 from axis 102, representing a high amount of access to the particular URL. the distance between the line and the axis 102 changes to reflect usage changes, as represented by the sharp decrease from peak 104 to valley 105.

Alpha bending, which introduces a transparency factor to an image, is used to emphasize high-usage data by making high-value points opaque and de-emphasize low-usage points by making low-value points transparent. This allows the visualization of traffic across URLs that have an angles of rotation such as line 125 that would otherwise be concealed by other lines. The dashed portions of line 115, near valleys 105, 107, and 109, represent segments of the line where usage is sufficiently low to require alpha bending.

The radial layout of the present invention avoids the extreme aspect ratio of plotting 5000 URLs over a period of time. Extreme aspect ratios typically force a distant view to accommodate the larger dimension or a detailed view that ignores some of the larger dimension. The radial layout also displays low-usage data at the core of the visualization so that the user can focus on the high-usage activity at the surface of the graph. A fundamental problem with other 3-D visualizations is that it is difficult to see into them so it is a good strategy to move the interesting data to the surface. The view towards the edges of the visualization are a good place to compare the usage patterns of a few adjacent documents. As shown in FIG. 1, usage patterns often move on a weekly cycle. As shown in FIG. 1, this is evidenced by Peaks 104, 106, 108, and 110 are contrasted against valleys 105, 107, and 109. The peaks may occur during the week where access is typically high, with the valleys occurring during the weekends. Graph 100 also shows a downward spike 116 which indicates a high usage during a weekend. At the bottom of display 100 is a slider bar 120 which allows a user to manipulate the rotation of graph 101. By moving the slider bar 120, a user can create animation frames which show a rotated view of the graph, thus allowing views of the graph 101 from different angles. The angle 122 is displayed directly above the slider 120. In FIG. 1A, the angle of rotation is 0 degrees.

Figure 2A:
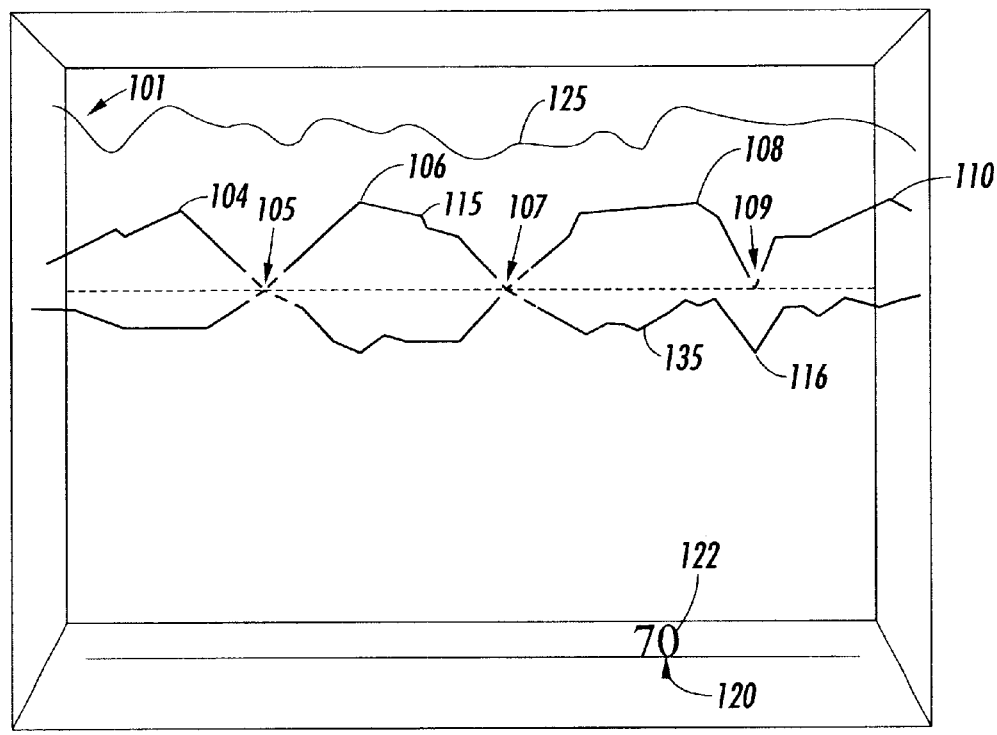
FIG. 2A shows the graph of FIG. 1A rotated to a different orientation.
Figure 2B:
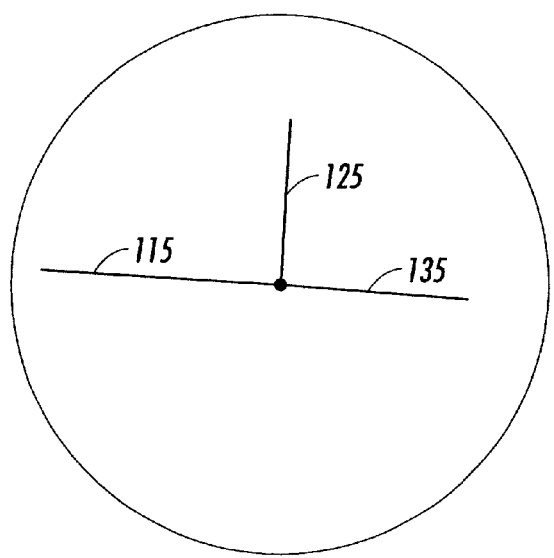
FIG. 2B shows the angles of rotation of the lines on the graph in FIG. 2A.

Directing attention to FIG. 2A, graph 101 is shown rotated to a different orientation. Line 125, which did not show much detail in FIG. 1A, and was visible by the use of alpha bending, now reveals more useful usage information, while the detail of lines 115 and 135 are less apparent. By rotating graph 101, the details of many lines may be closely examined.

Figure 3:
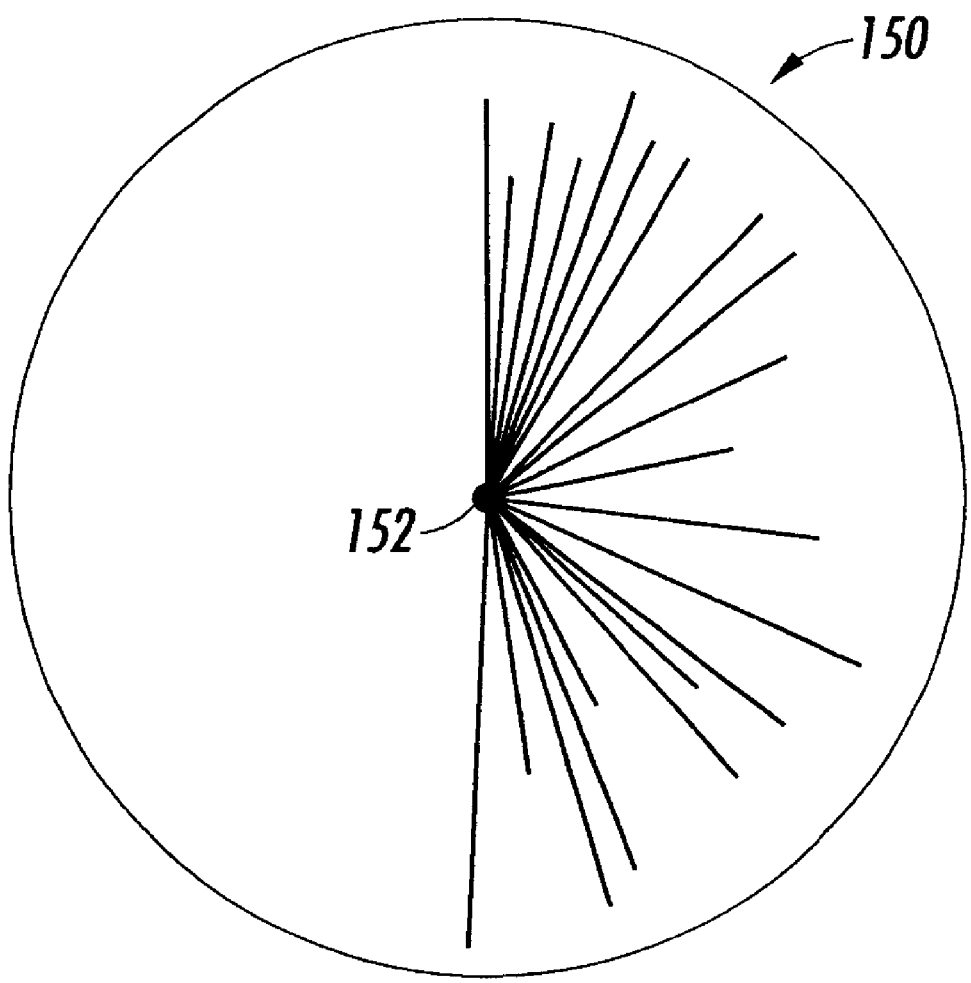
FIG. 3 shows an additional graph produced by an alternative embodiment of the invention.

In an alternative embodiment of the invention, instantaneous usage values maybe displayed. Directing attention to FIG. 3, Graph 150 shows instantaneous values for network traffic also based on a radial line layout. However, graph 150 is two-dimensional rather than three-dimensional and is focused on origin 152. Graph 150 may be used to represent a cross section or "slice" taken from graph 101; rather than drawing lines that display the traffic across URLs over a period of time as shown previously in FIGS. 1 and 2, a solid line is drawn from the origin 152 extending radially to display instantaneous usage data. The angle of rotation about the origin 152 denotes the lexicographical grouping of the URL, and the color may again be used to further visualize the grouping. The length of the lines represent the amount of access to the URLs at the specified time.

Figure 4:
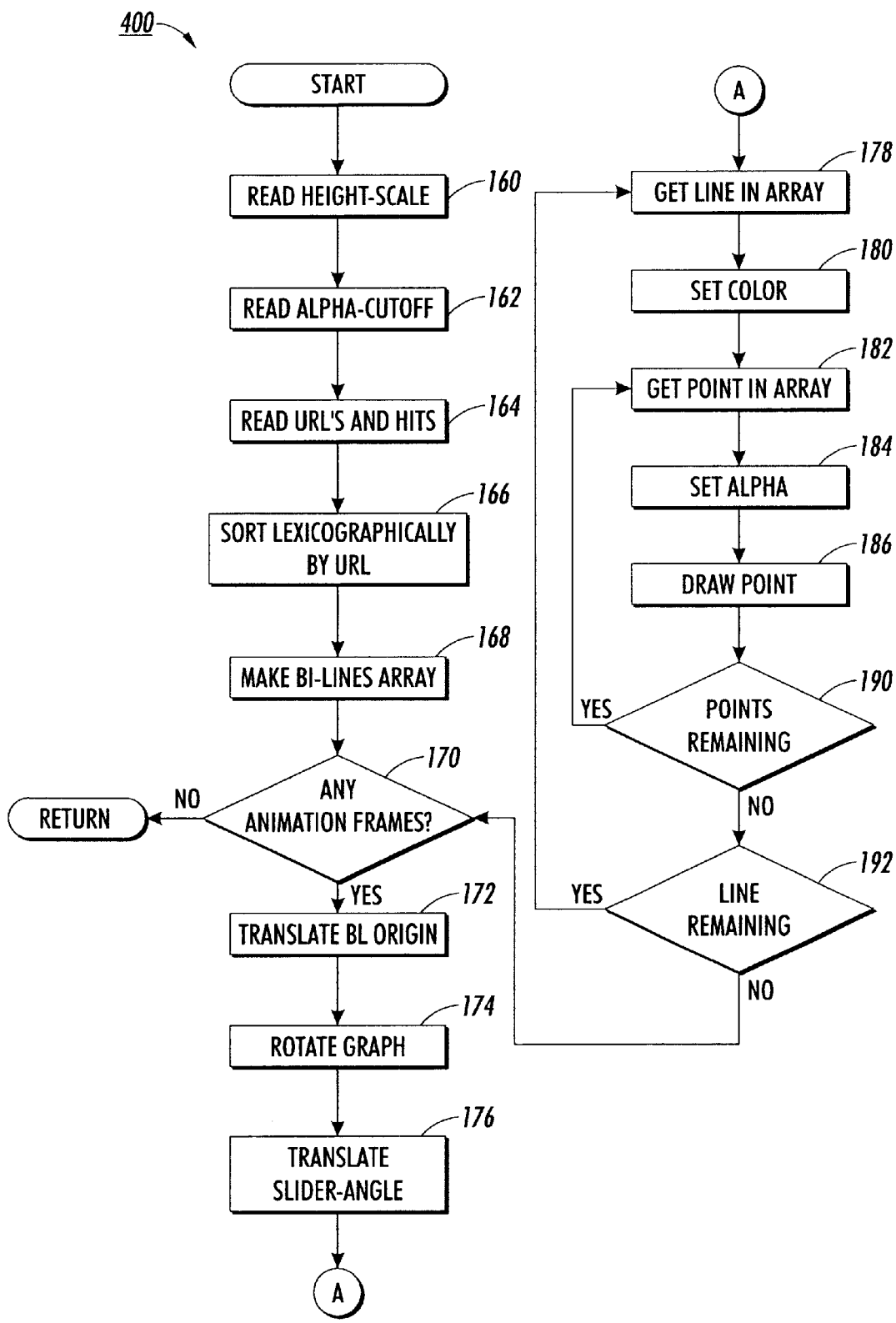
FIG. 4 shows in broad steps the logical sequence of operations that maybe executed by an embodiment of the invention.

FIG. 4 shows a logical sequence of steps that may be executed by program 400 to generate graph 100. Beginning at step 160, the height scale is read. By employing a height-scale factor, the extreme aspect ratio of a large number of URLs is avoided. The height-scale factor assigns a relative distance between the axis 102 and individual points on a line. At step 162, the alpha cutoff value is read. The alpha cutoff value determines how much transparency is incorporated into the graph, and may be supplied by the user. At step 164, a list of URLs and numerical values of accesses corresponding to those URLs is read. The list described in this step can be modified to contain different types of data to adapt the invention to any application where it is desirable to visualize numerical values associated with discrete entities. At step 166, the list of URLs is sorted. In the preferred embodiment, the list is sorted lexicographically, but any meaningful organization may be implemented. At step 168, an array for lines is created. At step 170, a determination is made whether any animation frames are remaining. This determination is based on whether the user wishes to manipulate the slider 120 to view the graph 100 from a different angle. If "YES", the graph 101 is translated at step 172 and rotated at step 174. The slider bar 120 is adjusted at step 176. Control continues to step 178 where the program gets the next line in the array. At step 180, the color of the line is set, based on the lexicography of the URL. If a different ordering method is used rather than lexicography, such ordering may also be used here to set the color. At step 182, it gets a point from the array of points. At step 184, the alpha value is set, which indicates the level of transparency of the point. At step 186, the point is drawn. At step 190, a determination is made whether any points are remaining. If "YES", control returns to step 182. If "NO", control proceeds to step 192 where a determination is made whether any lines are remaining. If lines are remaining, control returns to step 178. If no lines are remaining, control returns to step 170. At step 170, if there are no animation frames remaining, the program terminates.

Figure 5A:
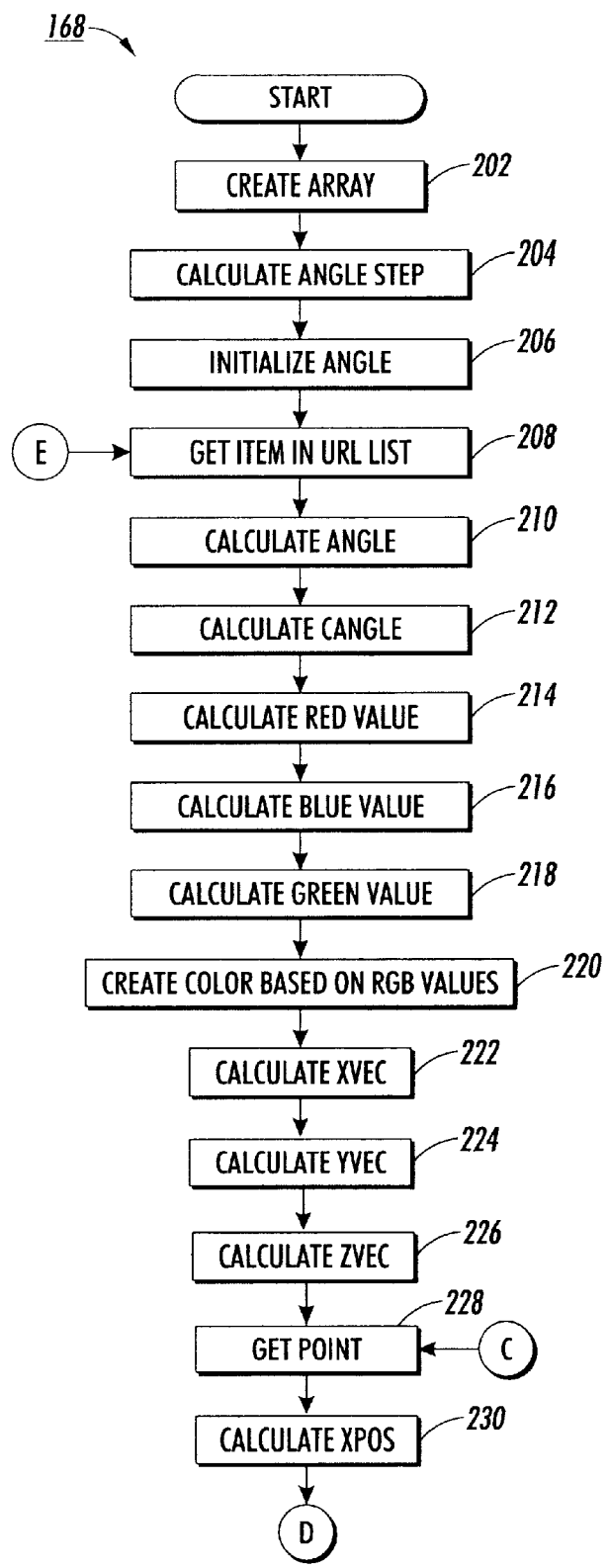
FIGS. 5A and 5B show a more detailed sequence of operations that may be executed by an embodiment of the invention.
Figure 5B:
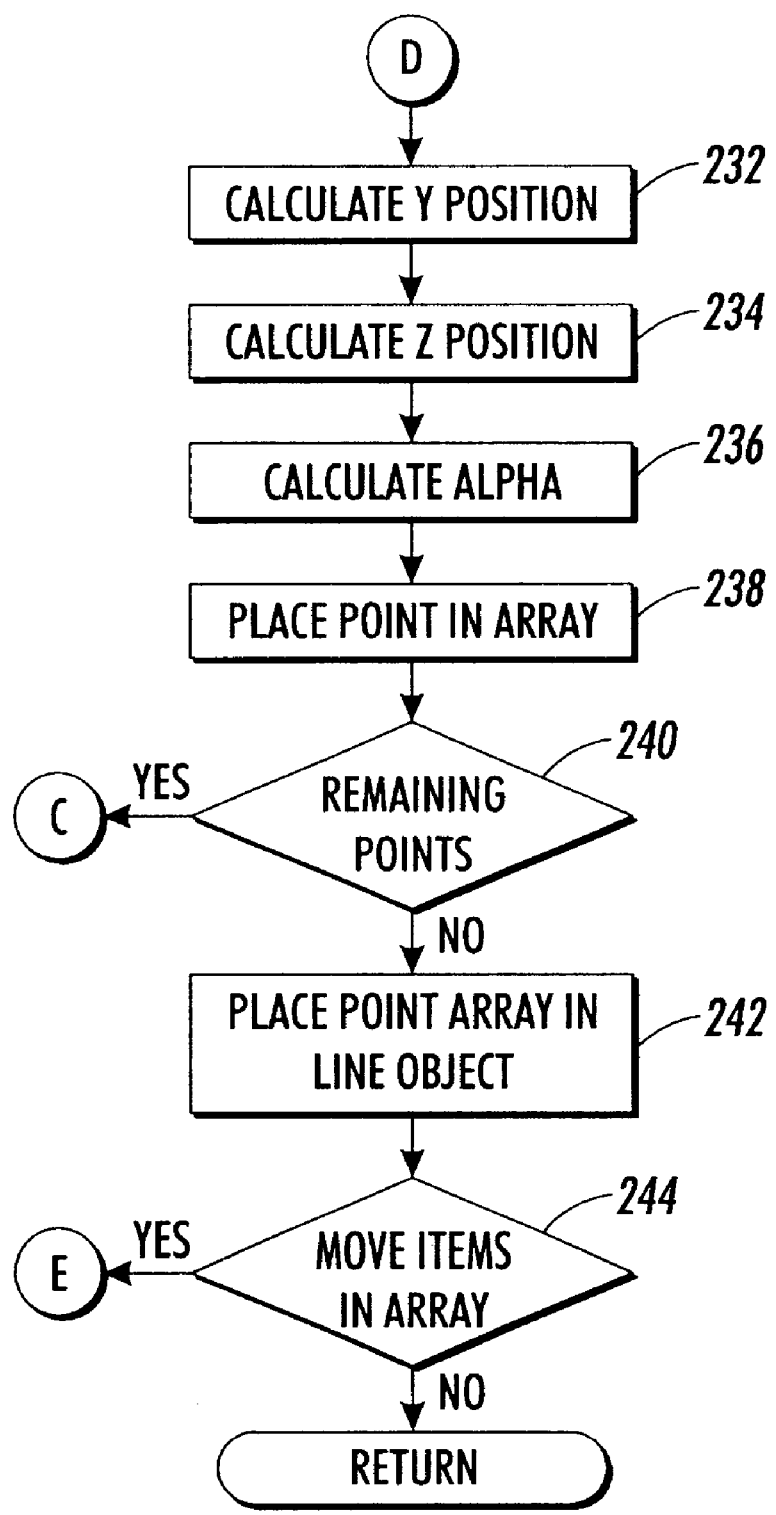

FIGS. 5A and 5B illustrate the logical sequence of steps to create the line array (step 168) in greater detail. Beginning at step 202, an array is created. The array will hold the usage values for the individual URLs at a discreet time as well as the angles of rotation for the individual URLs, which are used for grouping the lines on the graph. At step 204, the angle step is created. The angle step is created by dividing the angle span (180 degrees, for example) by the number of URLs. At step 206, the angle is initialized to −90 degrees. At step 208, the program gets an item in the URL list. Each item in the URL list will contain the URL and a corresponding number of hits. At step 210, the angle is increased by adding the angle step to it. At step 212, an angle to be used to calculate color, "c-angle," is calculated by adding 180 degrees to the angle. C-angle will be used to determine the values of red, green and blue to be used for coloring a line. At step 214, the red value is calculated. At step 216, the blue value is calculated. At step 218, the green value is calculated. (FIGS. 6A–6C describe the steps 214, 216 and 218 in greater detail.) At step 220, a color is created based on the RGB values calculated at steps 214, 216, and 218. Control proceeds to step 222 where the vector corresponding to the x axis is calculated by taking the cosine of the angle. Similarly, at step 224, the vector corresponding to the y axis is calculated by taking the sine of the angle. At step 226, the vector corresponding to the z axis is calculated by distance of the line from the axis 102. The distance of the line from the axis 102 varies according to usage for the particular URL. Continuing to step 228, the program gets a data point from the item retrieved from the URL list at step 208. A data point contains the usage value corresponding to the particular URL at a given time, and this information is contained in the sorted list of URLs and usage data. At step 230 the program calculates the x component of the position of the point by multiplying together the x vector, the usage value and the height scale. At step 232, the program calculates y component of the position of the point by multiplying together the x vector, the usage value and the height scale. At step 234, the program calculates Z position of the point by multiplying the z vector by the index of the data point in the URL list. Steps 230 and 232 can be recalculated for each point by repeating the sine and cosine operations, but since these are operationally expensive, these steps can be optimally performed by simply multiplying by the height scale (obtained at step 160).

At step 236, the program calculates the alpha value. The alpha value is used to perform the alpha bending described above, and an alpha cutoff value may be set to define the area in which transparency will be observed in graph 101. The usage value is compared to the alpha cutoff value, and if it is greater then the alpha value is set to 255, or full opacity. However, if the usage value is less than or equal to the alpha cutoff value, the alpha value is calculated by dividing the usage value by the alpha cut off value and multiplying the result by 255, to achieve a fading effect of the intensity of the line.

At step 238, the program places the data point and corresponding alpha value in a separate point array. Continuing to step 240, if there are any remaining points, program control returns to step 228. Otherwise, control continues to step 242 where the program places the point array in the line object. At step 244, if there are other items to be moved into the array, control returns to step 208. Otherwise the BL lines array is complete.

Figures 6A, 6B:
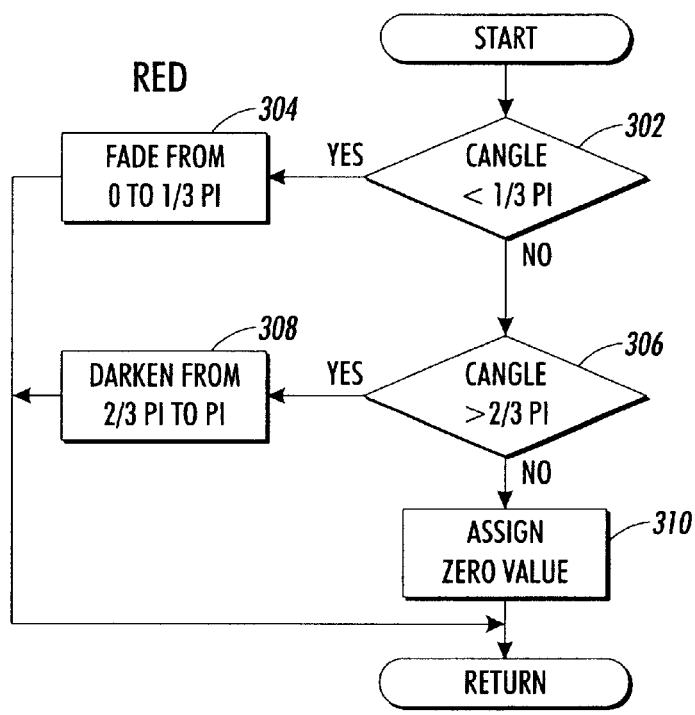
FIGS. 6A, 6B, and 6C show the sequences of operations that may be executed to color lines used to generate graphs by embodiments of the invention.
Figure 6C:
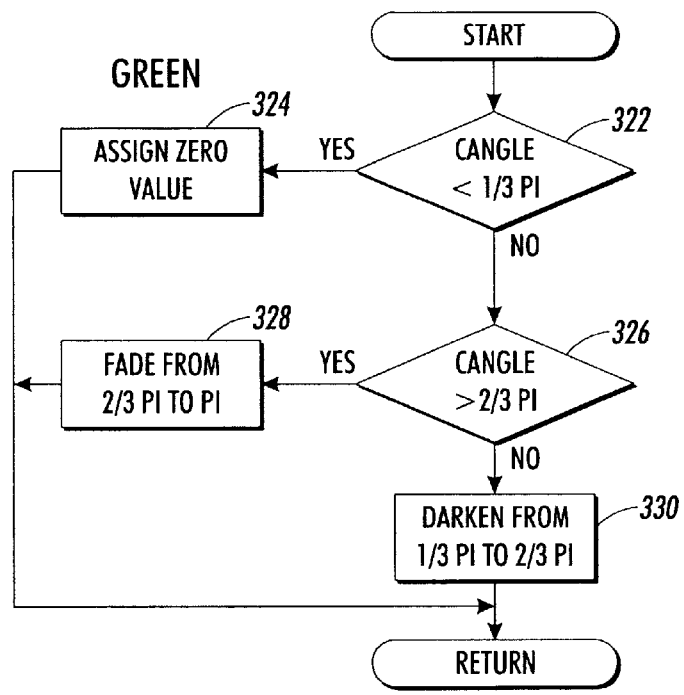

FIGS. 6A, 6B and 6C describe the steps performed to calculate the color of an individual line based on its angle of rotation from the axis 102. Directing attention to FIG. 6A, if C-angle is less than $\frac{1}{3}\pi$ at step 302, control continues to step 304 where the red value is faded from 0 to $\frac{1}{3}\pi$. However, if the C-angle is $\frac{1}{3}\pi$ or greater, control continues to step 306 where a further determination is made whether C-angle is greater than $\frac{2}{3}\pi$. If C-angle is greater than $\frac{2}{3}\pi$, then control continues to step 308 where the red value is darkened from $\frac{2}{3}\pi$ to $\pi$. However, if C-angle is $\frac{2}{3}\pi$ or less, control proceeds to step 310 where a zero-value is assigned to the red color component. The blue color component is calculated in a similar manner. Directing attention to FIG. 6B, if C-angle is less than $\frac{1}{3}\pi$ at step 312, control proceeds to step 314 where the blue component is darkened to $\frac{1}{3}\pi$. However, if C-angle is $\frac{1}{3}\pi$ or greater, control continues to step 316 where a determination is made as to whether c-angle is greater than $\frac{2}{3}\pi$. If C-angle is greater than $\frac{2}{3}\pi$, control proceeds to step 318 where a zero value is assigned to the blue component. Otherwise, if C-angle is $\frac{2}{3}\pi$ or less, control proceeds to step 320 where the blue component is faded from $\frac{1}{3}\pi$ to $\frac{2}{3}\pi$. Similarly, directing attention to FIG. 6C, the green value is calculated at step 322. The C-angle is determined to see whether it is less than $\frac{1}{3}\pi$. If "YES", control proceeds to step 324 where a zero value is assigned. However, if C-angle is $\frac{1}{3}\pi$ or greater, control continues to step 326 where a determination is made as to whether C-angle is greater than $\frac{2}{3}\pi$. If so, control proceeds to step 328 where the green component is faded from $\frac{2}{3}\pi$ to $\pi$. Otherwise, control proceeds to step 320 where the green color component is darkened from $\frac{1}{3}\pi$ to $\frac{2}{3}\pi$.

To create graph 150 (FIG. 3), an individual element of the BL lines array is examined. Each element will have the angle, color, and x,y point information corresponding to the URLs and usage data. By simply drawing lines from the origin 152 to the points using the color information, the graph 150 can be generated for any instantaneous traffic visualization across a plurality of URLs.

Figure 7:
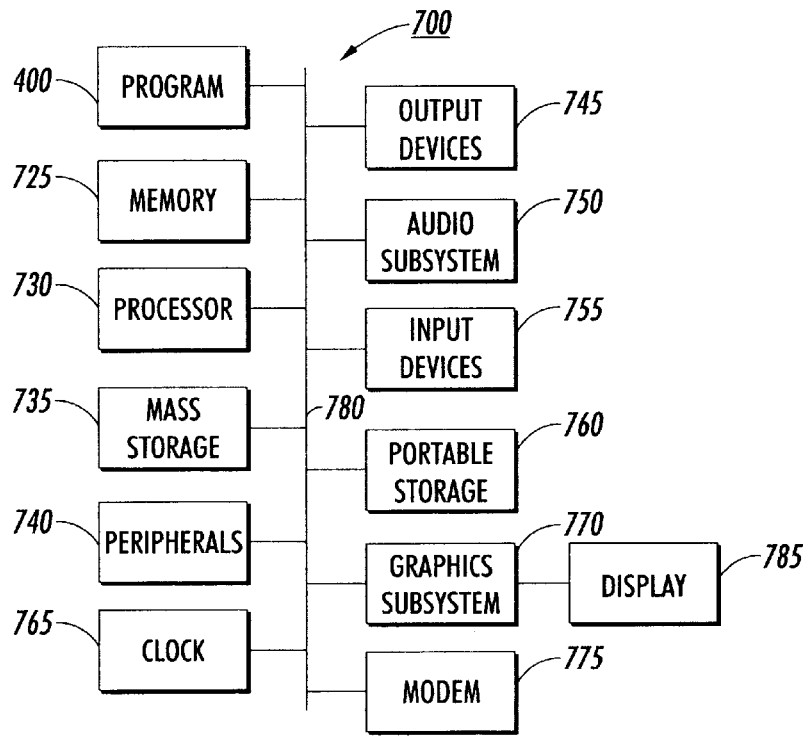
FIG. 7 shows a high level block diagram of a computer system used by embodiments of the present invention.

FIG. 7 is high level block diagram view of an embodiment of a computer system having a computer program that causes the computer system to perform the method of the present invention. The computer system 700 includes a processor 730 and memory 725. Processor 730 may contain a single microprocessor, or may contain a plurality of microprocessors for configuring the computer system as a multi-processor system. Memory 725, stores, in part, instructions and data for execution by processor 730. If the method of the present invention is wholly or partially implemented in software, including the computer program 400, memory 725 stores the executable code when in operation. Memory 725 may include banks of dynamic random access memory (DRAM) as well as high speed cache memory. The system 700 further includes a mass storage device 735, peripheral device(s) 740, input device(s) 755, portable storage medium drive(s) 760, a graphics subsystem 770 and a display 785, which displays graph 101. For simplicity, the components shown in FIG. 7 are depicted as being connected via a single bus 780. However, the components may be connected through one or more data transport means. For example, processor 730 and memory 725 may be connected via a local microprocessor bus, and the mass storage device 735, peripheral device(s) 740, portable storage medium drive(s) 760, and graphics subsystem 770 may be connected via one or more input/output (I/O) buses. Mass storage device 735, which is typically implemented with a magnetic disk drive or an optical disk drive, is a non-volatile storage device for storing data and instructions for use by processor 730. The method of the present invention also may be stored in processor 730. Portable storage medium drive 760 operates in conjunction with a portable non-volatile storage medium, such as a floppy disk, or other computer-readable medium, to input and output data and code to and from the computer system 700. Peripheral device(s) 740 may include any type of computer support device, such as an input/output (I/O) interface, to add additional functionality to the computer system 700. For example, peripheral device(s) 740 may include a network interface card for interfacing computer system 700 to a network, a modem, and the like. Input device(s) 755 provide a portion of a user interface. Input device(s) 755 may include an alpha-numeric keypad for inputting alpha-numeric and other key information, or a pointing device, such as a mouse, a trackball, stylus or cursor direction keys. In order to display textual and graphical information, the computer system 700 includes graphics subsystem 770 and display 785. Display 785 may include a cathode ray tube (CRT) display, liquid crystal display (LCD), other suitable display devices, or means for displaying, that enables a user to interact with the computer program. Graphics subsystem 770 receives textual and graphical information and processes the information for output to display 785. Additionally, the system 700 may include output devices 745. Examples of suitable output devices include speakers, printers, and the like. The devices contained in the computer system 700 are those typically found in general purpose computer systems, and are intended to represent a broad category of such computer components that are well known in the art. The computer system of FIG. 7 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, workstations, mainframes, and the like. Alternative embodiments of the use of the method of the present invention in conjunction with the computer system 700 further include using other display means, such as CRT display, LCD display, projection displays, or the like. Likewise, any similar type of memory, other than memory 725, may be used. Other interface apparatus, in addition to the component interfaces, may also be used including alpha-numeric keypads, other key information or any pointing devices such as a mouse, trackball, stylus, cursor or direction key.

While this invention has been described in conjunction with the specific embodiments outlined above, it is evident that many alternatives, modifications and variations are apparent to those skilled in the art. While the invention has been explained in the context of representing usage levels of URL's on the world wide web, it may be used in many different applications, such as visualizing usage levels of different computer files in a single computer system or local area network, or traffic across nodes in any type of network, representing populations of different geographic locations, database queries, or any application where it is advantageous to visualize numerical values associated with discrete entities. Accordingly, the preferred embodiments of the invention as set forth above are intended to be illustrative and not limiting. Various changes may be made without departing from the spirit and scope of this invention.

What is claimed is:

1. A method for visualizing relationships between computer files and amounts of access associated with said files, the method comprising the steps of:

(a) obtaining information containing at least one file identifier and numerical values representing accesses to said file over a period of time; and (b) creating a graph containing a central axis, at least one line, said line oriented substantially parallel to said axis at a single angle of rotation with respect to said axis, wherein the distance between said line and said axis varies according to the amount of access to said file at different intervals in said period of time.

2. The method as described in claim 1, further including the step of grouping lines by placing them in similar angles of rotation with respect to said axis such that a meaningful ordering of files is presented.

3. The method as described in claim 2, wherein said lines are grouped such that lexicographically similar file identifiers are represented by lines having similar angles of rotation with respect to said axis.

4. The method as described in claim 1, further including the step of coloring said lines such that similar file identifiers are assigned similar colors.

5. The method as described in claim 1, wherein said files are distributed across a computer network.

6. The method as described in claim 1, further including the step of attributing a transparency factor to said graph such that lines having certain angles of rotation with respect to said central axis are not obscured by other lines.

7. The method as described in claim 1, further including the step of rotating the graph about said central axis.

8. A computer readable medium for use with a computer apparatus to execute a method for visualizing relationships between computer files and amounts of access associated with said files, said medium including computer instructions which, when executed by said computer apparatus:

(a) Obtain information containing at least one file identifier and numerical values representing accesses to said file over a period of time; and (b) Create a graph containing a central axis, at least one line, said line oriented substantially parallel to said axis at a single angle of rotation with respect to said axis, wherein the distance between said line and said axis varies according to the amount of access to said file at different intervals in said period of time.

9. A method for visualizing relationships between computer files and amounts of access associated with said files, the method comprising the steps of:

(a) obtaining information containing at least one file identifier and numerical values representing accesses to said file over a period of time;

(b) creating a graph containing a central axis, at least one line, said line oriented substantially parallel to said axis at an angle of rotation with respect to said axis, wherein the distance between said line and said axis varies according to the amount of access to said file at different intervals in said period of time; and (c) rotating said graph about said central axis.

10. A method for visualizing access to computer files over a period of time, the method comprising the steps of:

(a) obtaining a computer file identifier;

(b) obtaining access information for said computer file identifier in said at least one computer file identifier;

(c) sorting said computer file identifier according to a predetermined format; and (d) creating a graph containing a central axis and a line representative of said access information, said line oriented substantially parallel to said axis at an angle of rotation with respect to said axis, wherein the distance between said line and said axis varies according to the amount of access to said computer files at different intervals in the period of time.

11. The method according to claim 10, including the steps of:

(a) determining whether the graph should be rotated about the central axis; and (b) translating said line oriented at said angle of rotation from said angle of rotation to a second angle of rotation.

12. The method according to claim 10, including the step of assigning a color to said line.

* * * * *